United States Patent
Luo et al.

(10) Patent No.: US 8,088,338 B2
(45) Date of Patent: Jan. 3, 2012

(54) SYSTEM AND APPARATUS FOR IONIC LIQUID CATALYST REGENERATION

(75) Inventors: Huping Luo, Richmond, CA (US);
Moinuddin Ahmed, Hercules, CA (US);
Krishniah Parimi, Alamo, CA (US);
Bong-Kyu Chang, San Rafael, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 12/727,180

(22) Filed: Mar. 18, 2010

(65) Prior Publication Data
US 2010/0172806 A1    Jul. 8, 2010

Related U.S. Application Data

(62) Division of application No. 12/003,577, filed on Dec. 28, 2007, now Pat. No. 7,955,999.

(51) Int. Cl.
*B01J 8/02* (2006.01)
*B01D 11/00* (2006.01)

(52) U.S. Cl. ......... 422/211; 422/187; 210/634; 210/638

(58) Field of Classification Search ................ 422/187, 422/211; 210/634, 638
See application file for complete search history.

(56) References Cited

U.S. PATENT DOCUMENTS

| | | | |
|---|---|---|---|
| 4,122,245 A | 10/1978 | Nardi et al. | |
| 4,463,071 A | 7/1984 | Gifford et al. | |
| 4,463,072 A | 7/1984 | Gifford et al. | |
| 4,973,780 A * | 11/1990 | Johnson et al. | 585/467 |
| 4,996,317 A * | 2/1991 | O'Brien et al. | 544/274 |
| 5,087,783 A * | 2/1992 | Johnson et al. | 585/475 |
| 5,104,840 A | 4/1992 | Chauvin et al. | |
| 5,414,186 A * | 5/1995 | Child et al. | 585/724 |
| 5,731,101 A | 3/1998 | Sherif et al. | |
| 5,750,455 A | 5/1998 | Chauvin et al. | |
| 6,004,519 A | 12/1999 | Doane et al. | |
| 6,028,024 A | 2/2000 | Hirschauer et al. | |
| 6,096,680 A | 8/2000 | Park | |
| 6,193,786 B1 * | 2/2001 | Henderson | 95/171 |
| 6,797,853 B2 | 9/2004 | Houzvicka et al. | |
| 7,534,922 B2 * | 5/2009 | Goring et al. | 568/594 |
| 7,651,970 B2 * | 1/2010 | Elomari et al. | 502/150 |
| 7,732,364 B2 | 6/2010 | Chang et al. | |
| 2003/0060359 A1 | 3/2003 | Olivier-Bourbigou et al. | |
| 2004/0077914 A1 | 4/2004 | Zavilla et al. | |
| 2004/0133056 A1 | 7/2004 | Liu et al. | |
| 2005/0244313 A1 * | 11/2005 | Petrik | 422/211 |
| 2006/0135839 A1 | 6/2006 | Elomari et al. | |

(Continued)

OTHER PUBLICATIONS

Miron, et al., "Molecular Structure of Conjunct Polymers", Journal of Chemical and Engineering Data, pp. 150-160 (1963).
Pines, Herman, Saga of a discovery: Alkylation:, Chem Tech, pp. 150-154 (1982).

(Continued)

*Primary Examiner* — Walter D Griffin
*Assistant Examiner* — Huy-Tram Nguyen
(74) *Attorney, Agent, or Firm* — Merchant & Gould

(57) ABSTRACT

Disclosed are a system and an apparatus for regenerating an ionic liquid catalyst, which has been deactivated by conjunct polymers during any type of reaction producing conjunct polymers as a by-product, for example, isoparaffin-olefin alkylation. The system and apparatus are designed such that solvent extraction of conjunct polymers, freed from the ionic liquid catalyst through its reaction with aluminum metal, occurs as soon as the conjunct polymers de-bond from the ionic liquid catalyst.

18 Claims, 1 Drawing Sheet

U.S. PATENT DOCUMENTS

Figure 1:
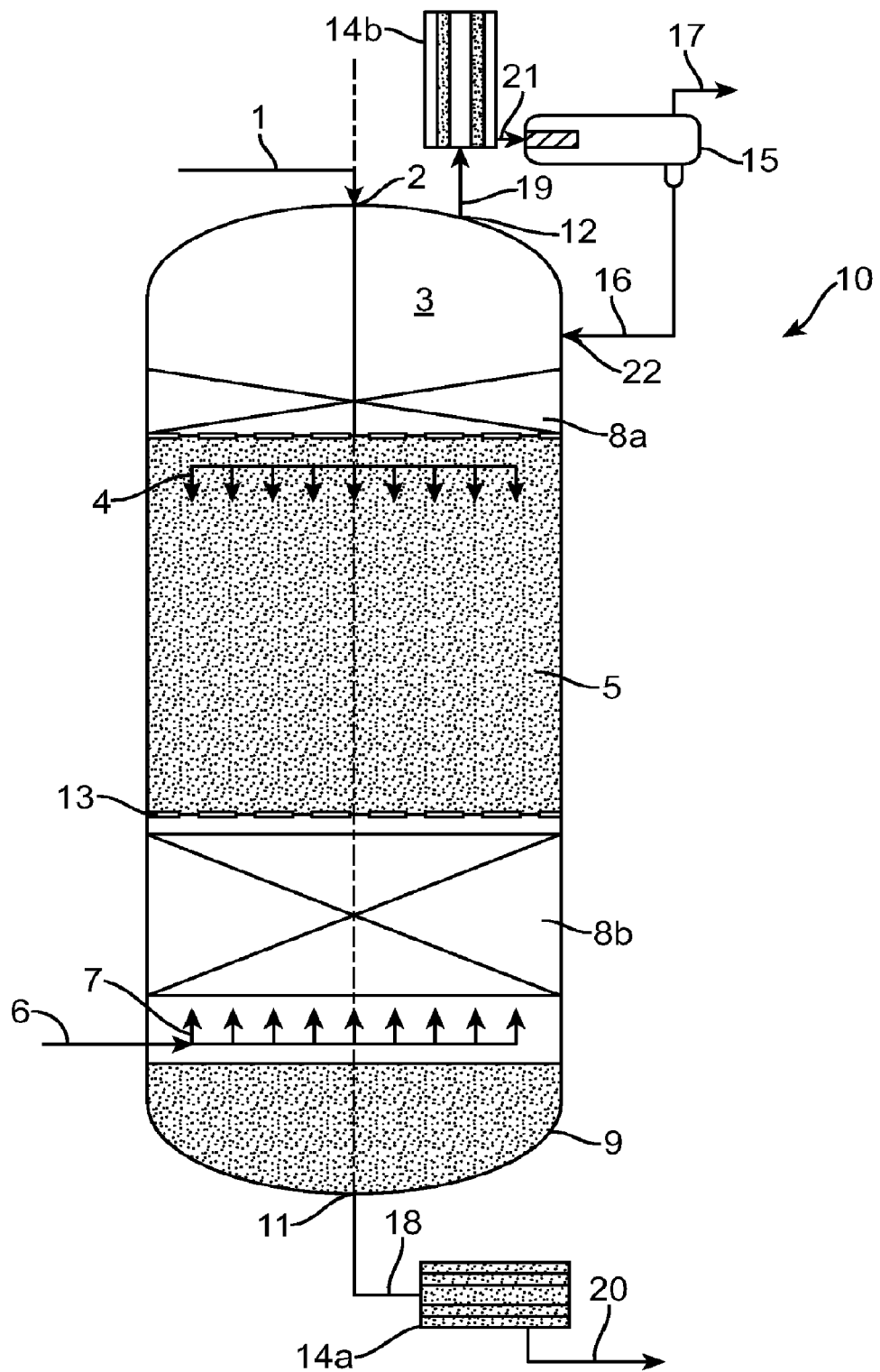

| | | | |
|---|---|---|---|
| 2006/0247482 A1* | 11/2006 | Hope et al. | 585/521 |
| 2006/0281958 A1* | 12/2006 | Buelna et al. | 585/446 |
| 2007/0142213 A1 | 6/2007 | Elomari et al. | |
| 2007/0142217 A1 | 6/2007 | Elomari et al. | |
| 2007/0142686 A1* | 6/2007 | Campbell et al. | 585/459 |

OTHER PUBLICATIONS

Roebuck, A.K. and Evering, B.L.. "Isobutane-Olefin Alkylation with Inhibited Aluminum Chloride Catalyst", Inc. Eng. Chem., Prod. Res. Develop., publ. vol. 9, pp. 76-82 (1970).

* cited by examiner

SYSTEM AND APPARATUS FOR IONIC LIQUID CATALYST REGENERATION

The present Application is a Divisional of U.S. patent application Ser. No. 12/003,577, filed Dec. 28, 2007, now U.S. Pat. No. 7,955,999, the contents of which are incorporated herein by reference in their entirety.

FIELD OF ART

The system and apparatus as described herein relate to regeneration of liquid catalysts. More particularly, the system and apparatus as described herein relate to regeneration of ionic liquid catalysts.

BACKGROUND

Ionic liquids are liquids that are composed entirely of ions as a combination of cations and anions. The most common ionic liquids are those prepared from organic-based cations and inorganic or organic anions. The most common organic cations are ammonium cations, but phosphonium and sulphonium cations are also frequently used. Pyridinium-based and imidazolium-based cations are perhaps the most commonly used cations. Anions include, but are not limited to, $BF_4-$, $PF_6-$, haloaluminates such as $Al_2Cl_7-$ and $Al_2Br_7-$, $[(CF_3SO_2)_2N]-$, alkyl sulphates ($RSO_3-$), carboxylates ($RCO_2-$) and many others. The most catalytically interesting ionic liquids are those derived from ammonium halides and Lewis acids (such as $AlCl_3$, $TiCl_4$, $SnCl_4$, $FeCl_3$ ... etc.). Ionic liquids may be suitable, for example, for use as a catalyst and as a solvent in alkylation.

One class of ionic liquids are the so-called "low temperature" ionic liquids, which are generally organic salts with melting points under 100° C. and often even lower than room temperature. Another class of ionic liquids is fused salt compositions, which are molten at low temperature and are useful as catalysts, solvents, and electrolytes. Such compositions are mixtures of components which are liquid at temperatures below the individual melting points of the components.

Chloroaluminate ionic liquids are perhaps the most commonly used ionic liquid catalyst systems. They are classified as low temperature ionic liquids or fused salt compositions. Alkyl imidazolium or pyridinium salts, for example, can be mixed with aluminum trichloride ($AlCl_3$) to form fused chloroaluminate salts. The use of fused salts of 1-alkylpyridinium chloride and aluminum trichloride as electrolytes is discussed in U.S. Pat. No. 4,122,245, which is incorporated by reference in its entirety herein. Other patents which discuss the use of fused salts of aluminum trichloride and alkylimidazolium halides as electrolytes are U.S. Pat. Nos. 4,463,071 and 4,463,072, which documents are incorporated by reference in their entirety herein.

U.S. Pat. No. 5,104,840, which is incorporated by reference in its entirety herein, describes ionic liquids which comprise at least one alkylaluminum dihalide and at least one quaternary ammonium halide and/or at least one quaternary ammonium phosphonium halide; and their uses as solvents in catalytic reactions.

U.S. Pat. No. 6,096,680, which is incorporated by reference in its entirety herein, describes liquid clathrate compositions useful as reusable aluminum catalysts in Friedel-Crafts reactions. In one embodiment, the liquid clathrate composition is formed from constituents comprising (i) at least one aluminum trihalide, (ii) at least one salt selected from alkali metal halide, alkaline earth metal halide, alkali metal pseudohalide, quaternary ammonium salt, quaternary phosphonium salt, or ternary sulfonium salt, or a mixture of any two or more of the foregoing, and (iii) at least one aromatic hydrocarbon compound.

Aluminum-containing catalysts are among the most common Lewis acid catalysts employed in Friedel-Craft reactions. Friedel-Craft reactions are reactions which fall within the broader category of electrophylic substitution reactions and include alkylations.

Other examples of ionic liquids and their methods of preparation are found in U.S. Pat. Nos. 5,731,101 and 6,797,853 and in U.S. Patent Application Publication Nos. 2004/0077914 and 2004/0133056. All of these documents are incorporated by reference in their entireties herein.

As a result of use, ionic liquid catalysts can become deactivated, i.e. lose activity, and may eventually need to be replaced. Alkylation processes utilizing an ionic liquid catalyst form by-products known as conjunct polymers. These conjunct polymers deactivate the ionic liquid catalyst by forming complexes with the ionic liquid catalyst. Conjunct polymers are highly unsaturated molecules and can complex the Lewis acid portion of the ionic liquid catalyst via their double bonds. For example, as aluminum trichloride in aluminum trichloride-containing ionic liquid catalysts becomes complexed with conjunct polymers, the activity of these ionic liquid catalysts becomes impaired or at least compromised. Conjunct polymers may also become chlorinated and through their chloro groups may interact with aluminum trichloride in aluminum-trichloride containing catalysts and therefore reduce the overall activity of these catalysts or lessen their effectiveness as catalysts for their intended purpose.

Deactivation of ionic liquid catalyst by conjunct polymers is not only problematic for alkylation chemistry, but also effects the economic feasibility of using ionic liquid catalyst as they are expensive to replace. Therefore, commercial exploitation of ionic liquid catalysts in alkylation is impossible unless they can be efficiently regenerated and recycled.

Only a few methods for removing conjunct polymers from acidic ionic liquid catalysts in order to regenerate the catalysts have been devised. These methods are described in U.S. Patent Application Publication No. 2007/0142213, which document is incorporated in its entirety herein, and include, for example, hydrogenation, addition of a basic reagent, and alkylation.

Hydrogenation saturates the double bonds of the conjunct polymers such that they release the acidic ionic liquid catalysts. For hydrogenation to occur, hydrogen must either be fed to the acidic ionic liquid catalyst/conjunct polymer complexes or hydrogen must be produced in situ. This may be done by treating the catalyst containing the conjunct polymers with a metal in the presence of a Broensted acid where interaction between the metal and the acid produces the needed hydrogen. For example, reacting aluminum metal with hydrochloric acid will produce hydrogen and aluminum trichloride. Treating the spent catalyst containing conjunct polymers with Al metal in the presence of enough HCl will produce the hydrogen needed to saturate the double bonds of the conjunct polymers. After hydrogenation, the hydrogenated conjunct polymers are removed by solvent extraction or decantation and the regenerated ionic liquid catalyst is recovered.

Addition of a basic agent (e.g., amines or ammonium chloride) similarly breaks up the acidic ionic liquid catalyst/conjunct polymer complexes as the basic agent forms new complexes with the catalyst. The basic agent must be carefully chosen so that it is part of the catalyst system undergoing regeneration. Otherwise, the basic agent will simply deactivate the catalyst in the same manner as the conjunct polymers.

Additionally, the basic agent will react not only with the acidic ionic liquid catalyst/conjunct polymer complexes (e.g., $AlCl_3$/conjunct polymer complexes) but also with any unbound cation (e.g., $AlCl_3$). Therefore, the basic agent must correspond to the basic parent species of cation from which the ionic liquid to be regenerated was originally produced and the basic agent must be added in an amount sufficient to react with both cations bound in the acidic ionic liquid/conjunct polymer complexes and unbound cations. Then the free conjunct polymers are removed and the remaining new complexes are contacted with additional unbound cations (e.g., $AlCl_3$) to fully regenerate the catalyst. As an example, a used chloroaluminate ionic liquid may be contacted with butylpyridinium chloride to provide butylpyridinium tetrachloroaluminate and free the conjunct polymers and then the butylpyridinium tetrachloroaluminate may be contacted with $AlCl_3$ to fully restore the catalyst's activity.

However, while effective, each of these methods suffers from certain shortcomings. Thus, to take advantage of the potential of ionic liquids as catalysts, particularly in alkylation reactions, the industry continues to search for an effective and efficient ionic liquid catalyst regeneration process.

SUMMARY

Disclosed herein is a system for regenerating an ionic liquid catalyst which has been deactivated by conjunct polymers comprising: feeding a slurry of aluminum metal and the ionic liquid catalyst into the top of a moveable bed comprised of aluminum metal within a reactor, wherein at least a portion of the ionic liquid catalyst is bound to conjunct polymers; feeding a solvent and optionally hydrogen gas into the bottom of the reactor to move upwards through the reactor and into the moveable bed; reacting the aluminum metal with the ionic liquid catalyst in the presence or the absence of the hydrogen gas in the moveable bed to free the conjunct polymers from the ionic liquid catalyst; and extracting the conjunct polymers from the ionic liquid catalyst with the solvent to provide a regenerated ionic liquid catalyst. The system can be used in a method for regenerating ionic liquid catalyst which has been deactivated by conjunct polymers.

Also disclosed herein is an apparatus for regenerating an ionic liquid catalyst which has been deactivated by conjunct polymers comprising a reactive extraction column. The reactive extraction column comprises: (a) an upper feed port in the upper end of the reactive extraction column, wherein a slurry of ionic liquid catalyst and aluminum metal enter the reactive extraction column; (b) a lower feed port in the lower end of the reactive extraction column, wherein a solvent and, if so desired, hydrogen gas enter the reactive extraction column; (c) a moveable bed comprised of aluminum metal between the upper and lower feed ports, wherein the ionic liquid catalyst and the aluminum metal reacts in the presence or absence of hydrogen gas to free conjunct polymers from the ionic liquid catalyst and some of the freed conjunct polymers are extracted from the ionic liquid catalyst by the solvent to provide regenerated ionic liquid catalyst; (d) a lower exit port in the lower end of the reactive extraction column, wherein the regenerated ionic liquid catalyst exits the reactive extraction column; and (e) an upper exit port in the upper end of the reactive extraction column, wherein the solvent and freed conjunct polymers exit the reactive extraction column.

Among other factors, the system and apparatus disclosed herein are based on the recent discovery of a novel process, including reaction and extraction steps, to remove conjunct polymers from the ionic liquid catalyst. The reaction step entails contacting an ionic liquid catalyst with aluminum metal in the presence or absence of hydrogen gas to dissociate the conjunct polymers from the ionic liquid catalyst. It has been discovered that this dissociation allows the conjunct polymers to be thereafter successfully removed from the resulting conjunct polymer-ionic liquid catalyst mixture by solvent extraction to produce a regenerated ionic liquid catalyst that may be recycled to any process in which the catalyst is utilized. However, it has been realized that when the conjunct polymers remain in the vicinity of the ionic liquid catalyst for any appreciable length of time, they re-bond with and again deactivate the catalyst. Such re-deactivation cannot be tolerated. Thus, the conjunct polymers must be extracted as soon as they are freed from the ionic liquid catalyst. The present system and apparatus provide an effective and efficient means of conducting the novel process so that the freed conjunct polymers do not have the opportunity to re-deactivate the ionic liquid catalyst.

BRIEF DESCRIPTION OF THE FIGURE OF THE DRAWING

The FIGURE of the drawing is a schematic illustration of an apparatus as disclosed herein for regenerating an ionic liquid catalyst which has been deactivated by conjunct polymers.

DETAILED DESCRIPTION

Definitions

The term "conjunct polymer" as used herein refers to a polymeric compound that might bond to a cationic species of the ionic liquid catalyst by pi bonding or sigma bonding or other means, which results in the polymeric compound binding to the catalyst, so that it is not removable by simple hydrocarbon extraction.

As used herein, the term "isoparaffin" means any branched-chain saturated hydrocarbon compound, i.e., a branched-chain alkane with a chemical formula of $C_nH_{2n+2}$. Examples of isoparaffins are isobutane and isopentane.

The term "olefin" means any unsaturated hydrocarbon compound having at least one carbon-to-carbon double bond, i.e. an alkene with a chemical formula of $C_nH_{2n}$. Examples of olefins include ethylene, propylene, butene, and so on.

The term "moveable bed," as used herein, refers to the fluidic bed formed by the interaction of the ionic liquid catalyst, the solvent, and aluminum metal within the reactor.

A specially designed system and apparatus for conducting a process of regenerating or re-activating an ionic liquid catalyst, which has been deactivated by conjunct polymers, are disclosed herein. Basically, the catalyst regeneration process involves first reacting spent ionic liquid catalyst with aluminum metal in the presence or absence of hydrogen gas in order to free conjunct polymers from the ionic liquid catalyst and then extracting the freed conjunct polymers from the catalyst phase with a solvent. Conjunct polymers form during a variety of reactions in which ionic liquid catalysts are employed, for example, alkylation, polymerization, dimerization, oligomerization, acetylation, metatheses, and copolymerization. Conjunct polymers are also by-products of many types of Friedel-Crafts reactions, which are reactions that fall within the broader category of electrophylic substitution, like alkylation and acylation. The system and apparatus as described herein can be incorporated into an alkylation process whereby isoparaffins (e.g., isobutane and/or isopentane) and olefins (e.g., ethylene, propylene, and/or butene) react to form low volatility, high quality gasoline blending components.

The term conjunct polymer was first used by Pines and Ipatieff to distinguish these polymeric molecules from the usual polymers. Unlike typical polymers, conjunct polymers are polyunsaturated cyclic, polycyclic and acyclic molecules formed by concurrent acid-catalyzed reactions including, among others, polymerization, alkylation, cyclization, and hydride transfer reactions. Conjunct polymers consist of an unsaturated intricate network of molecules that may include one or a combination of 4-, 5-, 6- and 7-membered rings and some aromatic entities in their skeletons. Some examples of the likely polymeric species were reported by Miron et al. (*Journal of Chemical and Engineering Data*, 1963) and Pines (*Chem. Tech*, 1982), which documents are incorporated by reference in their entirety herein. These molecules contain double and conjugated bonds in intricate structures containing a combination of cyclic and acyclic skeletons.

In practice, conjunct polymers are also called "red oils" due to their color and "acid-soluble oils" due to their high uptake in the catalyst phase where saturated hydrocarbons and paraffinic products are usually immiscible.

The conjunct polymers deactivate ionic liquid catalysts because they form complexes with or simply interact with the ionic liquid catalysts. It is believed that complexes form because conjunct polymers, by virtue of their double bonds, form pi complexes with the Lewis acid species in the ionic liquid catalyst. As an example, conjunct polymers can complex with $AlCl_3$, a Lewis acid present in the ionic liquid catalyst 1-butyl-pyridinium heptachloroaluminate. Complex formation can weaken the acid strength of the catalyst, decrease catalyst activity, and eventually render the catalyst ineffective for influencing reactions such as an alkylation reaction between isoparaffins and olefins. As a result, it is believed that catalyst activity is a function of the concentration of conjunct polymers in the ionic liquid phase whereby catalyst activity decreases as the concentration of conjunct polymers increases.

The system and apparatus as described herein are especially suited for conducting the catalyst regeneration process because they perform the reaction step of freeing the conjunct polymers and the extraction step of removing the conjunct polymers almost simultaneously. It is advantageous, if not necessary, to react the ionic liquid catalyst to free the conjunct polymers and subsequently extract the freed conjunct polymers from the ionic liquid catalyst within a very short period of time because the freed conjunct polymers can re-bond to the ionic liquid catalyst if left in the catalyst phase. Such re-bonding or re-complexing is obviously undesirable and defeats the purpose of the catalyst regeneration process. But if the conjunct polymers are immediately removed from the catalyst phase, they cannot again deactivate the ionic liquid catalyst. Since the system and apparatus as described herein permit extraction the instant the conjunct polymers are freed, the system and apparatus can have improved conjunct polymer recovery rates.

The catalyst regeneration system and apparatus as disclosed herein can be used to regenerate an ionic liquid catalyst used to catalyze any one of various types of reactions including Friedel-Crafts reactions. However, in one embodiment, the ionic liquid catalyst is used to catalyze an alkylation reaction between at least one isoparaffin and at least one olefin.

System

The present system comprises feeding a slurry of aluminum metal and the ionic liquid catalyst into the top of a moveable bed comprised of aluminum metal within a reactor while also feeding a solvent and optionally hydrogen gas into the bottom of the reactor. These feeds create a counter-current flow within the reactor. It is important that at least a portion of the ionic liquid catalyst in the system is bound to conjunct polymers, and, therefore, is deactivated. The solvent and hydrogen, if fed, move upwards through the reactor into the moveable bed, where they meet the slurry of aluminum metal and ionic liquid catalyst. In the moveable bed of the system, the aluminum metal reacts with the ionic liquid catalyst in the presence or the absence of hydrogen gas to free (i.e. de-bond) the conjunct polymers from the catalyst. Thereafter, the system involves extracting the conjunct polymers from the ionic liquid catalyst with the solvent, which results in a regenerated ionic liquid catalyst.

In one embodiment of the system as described herein, the moveable bed is sandwiched between a pair of extraction packings. The extraction packings serve to trap any portion of catalyst and aluminum metal that escapes from the area of the moveable bed. The portion of the aluminum metal and catalyst that travels to the lower extraction packing has the opportunity to further react in the lower extraction packing. The portion of the aluminum metal and that travels to the upper extraction packing has the opportunity to further react in the upper extraction packing. Thus, the extraction packings can provide an additional reaction zone and increase the chance of the aluminum metal reacting to extinction thereby reducing aluminum loss.

The step of extracting the conjunct polymers from the ionic liquid catalyst can take place in only the moveable bed or in both the moveable bed and the extraction packings. When the system does not include extraction packings, all extraction occurs in the moveable bed. However, when the system includes both the moveable bed and the extraction packings, a portion of the extraction occurs in the moveable bed and a portion of the extraction occurs in the extraction packings. When the conjunct polymer recovery rate is higher, the extraction step generally takes place in both the moveable bed and extraction packings.

In the extraction packings, the freed conjunct polymers are extracted by the solvent such that regenerated catalyst flows from the extraction packings. The aluminum metal may remain in the extraction packings for further reaction or, alternatively, may exit the reactor.

The regeneration system can further include isolating the regenerated ionic liquid catalyst and the solvent, respectively. Once the regenerated ionic liquid catalyst is isolated, it may be returned to the process for which it is needed, for example, alkylation. Isolating the solvent allows for recycling the solvent to the system so that it is not necessary to constantly feed new solvent to the reactor. However, it should be appreciated that a certain amount of fresh, make-up solvent may need to be provided to the reactor in addition to the recycled solvent.

Isolation of the regenerated ionic liquid catalyst may be accomplished by filtration. Filtering the regenerated ionic liquid catalyst after extracting the conjunct polymers from it will remove any aluminum metal present in the ionic liquid catalyst. Such filtering prevents the aluminum metal from being carried away to and fouling or otherwise affecting, due to the presence of solid particles, downstream process units.

Likewise, filtration of the solvent can lead to isolation of the solvent. Filtering the solvent and its dissolved conjunct polymers after extracting the conjunct polymers from the ionic liquid catalyst will remove any aluminum metal present in the solvent-conjunct polymer phase. As stated above, filtering prevents aluminum metal from being carried away to and fouling or otherwise affecting, due to the presence of solid particles, downstream process units.

It is also possible to isolate additional regenerated catalyst from any residual solvent-conjunct polymer phase by coalescing (i.e. reverse emulsifying) the solvent-conjunct polymer phase. In the system as described herein, a portion of the ionic liquid catalyst is inevitably blended with the solvent and its dissolved conjunct polymers. This catalyst-solvent-conjunct polymer mixture is generally in the form of an emulsion. Therefore, coalescing the mixture separates the catalyst from the solvent and conjunct polymers. This separated, regenerated catalyst, even if it is only a small amount, can be returned to the process in which the catalyst is used. Ionic liquid catalysts are generally quite expensive, so this coalescing step is beneficial to the system as described herein and any process in which the catalyst is exploited.

As explained above, the regeneration system extracts the freed conjunct polymers from the catalyst phase soon after they are de-bonded from the ionic liquid catalyst so that they do not have the opportunity to re-bond to the ionic liquid catalyst. Thus, it is extremely beneficial if the step of extracting the conjunct polymers from the ionic liquid catalyst with the solvent occurs instantaneously after the step of reacting the aluminum metal with the ionic liquid catalyst.

Apparatus

The present apparatus comprises a single process unit, called a reactive extraction column, in which both the reaction and extraction steps occur essentially simultaneously.

The reactive extraction column 10 is illustrated in the FIGURE as a vertical column. It comprises (1) an upper feed port 2 in the upper end of the column; (2) a lower feed port 6 in the lower end of the column; (3) a moveable bed 5 comprised of aluminum metal between the upper and lower feed ports 2, 6; (4) a lower exit port 11 in the lower end of the column; and (5) an upper exit port 12 in the upper end of the column. A slurry of ionic liquid catalyst and aluminum metal 1 enter the column through the upper feed port 2, while a solvent and optionally hydrogen gas enter the column through the lower feed port 6. The feed ports and exit ports of the column set up a counter-current flow within the column. The slurry of ionic liquid catalyst and aluminum metal 1 migrates downward through the column, while the solvent and optional hydrogen gas migrate upward through the column. All four components meet in the moveable bed 5 where the ionic liquid catalyst and the aluminum metal react in the presence or absence of the hydrogen gas to free conjunct polymers from the ionic liquid catalyst. The moveable bed 5 also facilitates quick extraction of the freed conjunct polymers from the ionic liquid catalyst into the solvent as the solvent is present in the moveable bed 5. Such extraction provides a regenerated ionic liquid catalyst. The regenerated ionic liquid catalyst 18 then exits the column through the lower exit port 11 and the solvent with its dissolved conjunct polymers 19 exit the column through the upper exit port 12.

The reactive extraction column may further comprise a pair of extraction packings, referred to herein as an upper extraction packing 8a and a lower extraction packing 8b. The extraction packings can be commonly available packings, e.g., structural metal packings or Rasching rings or Koch-Sulzer packings, etc. The purpose of the packing is to increase surface area for reaction and extraction, increase mixing, and enhance liquid-liquid mass transfer. The upper and lower extraction packings 8a, 8b surround the moveable bed such that the moveable bed is sandwiched between them. The upper and lower extraction packings 8a, 8b further facilitate the catalyst regeneration process. The extraction packings serve two primary purposes.

First, the extraction packings provide a second reaction zone for the ionic liquid catalyst and any aluminum metal carried over to them from the moveable bed. Catalyst may escape the moveable bed prior to reaction with the aluminum metal. If so, the unreacted catalyst may be trapped by the extraction packings where it can react with aluminum metal. Alternatively, aluminum metal may escape the moveable bed. If so, this aluminum metal may be trapped by the extraction packings where it can react with and be consumed by deactivated catalyst.

Second, the extraction packings provide an additional extraction zone for solvent extracting the freed conjunct polymer from the ionic liquid catalyst/conjunct polymer phase. In a column without extraction packings, a portion of regenerated ionic liquid catalyst might escape from the moving bed prior to extraction thereby allowing any freed conjunct polymer to re-bond with that portion of regenerated ionic liquid catalyst. The extraction packings prevent this problem by providing an area between the moving bed and the upper and lower exit ports where the solvent has an additional opportunity to remove the freed conjunct polymers.

The reactive extraction column may further include a screen 13 between the movable bed 5 and the lower extraction packing 8b as shown in the FIGURE. Since the reactive extraction column 10 is a vertical column, the aluminum metal tends to eventually descend to the lower end of the moveable bed. The screen 13 traps stray aluminum metal that has migrated through gravitational effects before it can fall into a pool of regenerated ionic liquid catalyst 9, which accumulates at the bottom of the column.

The apparatus may also further include filters 14a, 14b for removing aluminum metal carried over from the column to the regenerated ionic liquid catalyst 18 and the solvent-conjunct polymer phase 19, respectively. A first filter 14a can be in fluid communication with the lower exit port 11 such that the regenerated ionic liquid catalyst 18 passes through the filter 14a. The filter 14a traps aluminum metal to provide an aluminum-free, regenerated ionic liquid catalyst 20. A second filter 14b can be in fluid communication with the upper exit port 12 such that the solvent-conjunct polymer phase 19 passes through the filter 14b. The filter 14b traps aluminum metal to provide an aluminum-free, solvent-conjunct polymer phase 21. In a reactive extraction column without extraction packings, the filters 14a, 14b are even more important because there are no extraction packings to trap the aluminum metal and prevent it from traveling to downstream process units. Aluminum metal collected in the first and second filters 14a, 14b will eventually be fed into the column for consumption.

Additionally, the apparatus can include a coalescer 15 downstream from the second filter 14b to remove ionic liquid catalyst blended with the aluminum-free, solvent-conjunct polymer phase 21. The coalescer 15 is reverse-emulsifier, which separates the catalyst from the solvent-conjunct polymer phase. The catalyst 16 is heavier than the solvent-conjunct polymer phase 17, so it sinks to the bottom of the coalescer and can be drawn off and returned to the column 10 through a recycle inlet port 22 in the upper end of the column 10. In this manner, no expensive ionic liquid catalyst is wasted and the solvent can be subsequently isolated and re-used in the column.

In one embodiment of the apparatus as described herein, the reactive extraction column can further comprise a settling zone 3, a first feed distributor 4, and a second feed distributor 7. The settling zone 3 is an area located immediately below the upper feed port 2, where the slurry of ionic liquid catalyst and aluminum metal 1 settles. The feed that enters the column through the upper feed port is directed to the first feed distributor 4, which uniformly distributes it downward through the column 10 and into the moveable bed 5. Due to its function, the first feed distributor 4 is located below the settling zone 3 and above the moveable bed 5. While the first feed distributor 4 dispenses the slurry, its counterpart, the second feed distributor 7 uniformly distributes the solvent and hydrogen gas, if used, from the lower feed port 6 upwards through the column 10 and into the moveable bed 5. The second feed distributor 7 is located adjacent to the lower feed port 6 in the bottom end of the column 10 such that it is above the ionic liquid catalyst pool 9 and below the moveable bed 5. Then, in the moveable bed 5 and the upper and lower extraction packings 8a, 8b (if present), the ionic liquid catalyst, aluminum metal, hydrogen gas, and solvent interact as described above.

Hydrogen

According to the present system and apparatus, hydrogen may be supplied from any source. Hydrogen may be separately supplied from an outside source. For example, hydrogen can be bought and transported to the location where the regeneration process takes place or hydrogen can be supplied from a separate on-site facility that reforms natural gas into hydrogen using stream reforming processes.

Solvent

Solvent extraction, which occurs in both the system and apparatus as described herein, is a common method of extraction. The solvent can be a low boiling point solvent so that it is easily recovered. Hydrocarbon solvents function well as solvents in the present system and apparatus. Exemplary hydrocarbon solvents are pentane, hexane, heptane, octane, decane, n-butane, isobutane, isopentane, and mixtures thereof. The solvent can be a non-branched hydrocarbon solvent so that side reactions with the regenerated catalyst are limited.

Aluminum Metal

The aluminum metal can be in the form of, for example, powder (20-75 micrometer), pellets (1-3 mm) or aluminum beads (5-15 nm). Alternatively, the aluminum metal can be in the form of granules, sponges, gauzes, wire, rods, etc. Any size and shape is acceptable as long as sufficient external surface area is available. The aluminum metal may be in (1) macroscopic form, which includes wires, foils, fine particles, sponges, gauzes, granules, etc. or (2) microscopic form, which includes powders, smokes, colloidal suspensions, and condensed metal films.

Ionic Liquid Catalyst

Any type of ionic liquid catalyst may be regenerated in the system and apparatus as described herein. Ionic liquid catalysts are well known in the art. The system and apparatus as described herein can employ a catalyst composition comprising at least one aluminum halide such as aluminum chloride, at least one quaternary ammonium halide and/or at least one amine halohydrate, and at least one cuprous compound. Such a catalyst composition and its preparation is disclosed in U.S. Pat. No. 5,750,455, which is incorporated by reference in its entirety herein.

Alternatively, the ionic liquid catalyst can be a pyridinium or imidazolium-based chloroaluminate ionic liquid. These ionic liquids have been found to be much more effective in the alkylation of isopentane and isobutane with ethylene than aliphatic ammonium chloroaluminate ionic liquid (such as tributyl-methyl-ammonium chloroaluminate). The ionic liquid catalyst can be (1) a chloroaluminate ionic liquid catalyst comprising a hydrocarbyl substituted pyridinium halide of the general formula A below and aluminum trichloride or (2) a chloroaluminate ionic liquid catalyst comprising a hydrocarbyl substituted imidazolium halide of the general formula B below and aluminum trichloride. Such a chloroaluminate ionic liquid catalyst can be prepared by combining 1 molar equivalent hydrocarbyl substituted pyridinium halide or hydrocarbyl substituted imidazolium halide with 2 molar equivalents aluminum trichloride. The ionic liquid catalyst can also be (1) a chloroaluminate ionic liquid catalyst comprising an alkyl substituted pyridinium halide of the general formula A below and aluminum trichloride or (2) a chloroaluminate ionic liquid catalyst comprising an alkyl substituted imidazolium halide of the general formula B below and aluminum trichloride. Such a chloroaluminate ionic liquid catalyst can be prepared by combining 1 molar equivalent alkyl substituted pyridinium halide or alkyl substituted imidazolium halide to 2 molar equivalents of aluminum trichloride.

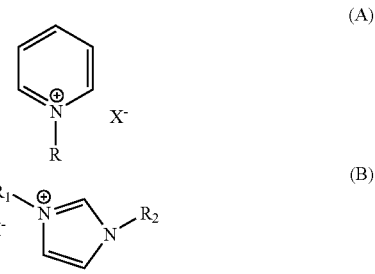

wherein R=H, methyl, ethyl, propyl, butyl, pentyl or hexyl group and X is a haloaluminate and preferably a chloroaluminate, and $R_1$ and $R_2$=H, methyl, ethyl, propyl, butyl, pentyl, or hexyl group and where $R_1$ and $R_2$ may or may not be the same.

The ionic liquid catalyst can also be mixtures of these chloroaluminate ionic liquid catalysts. Preferred chloroaluminate ionic liquid catalysts are 1-butyl-4-methyl-pyridinium chloroaluminate (BMP), 1-butyl-pyridinium chloroaluminate (BP), 1-butyl-3-methyl-imidazolium chloroaluminate (BMIM), 1-H-pyridinium chloroaluminate (HP), and N-butylpyridinium chloroaluminate $(C_5H_5NC_4H_9Al_2Cl_7)$, and mixtures thereof.

A metal halide may be employed as a co-catalyst to modify the catalyst activity and selectivity. Commonly used halides for such purposes include NaCl, LiCl, KCl, $BeCl_2$, $CaCl_2$, $BaCl_2$, $SiCl_2$, $MgCl_2$, $PbCl_2$, CuCl, $ZrCl_4$, and AgCl as published by Roebuck and Evering (Ind. Eng. Chem. Prod. Res. Develop., Vol. 9, 77, 1970), which is incorporated by reference in its entirety herein. Especially useful metal halides are CuCl, AgCl, $PbCl_2$, LiCl, and $ZrCl_4$. Another useful metal halide is $AlCl_3$.

HCl or any Broensted acid may be employed as an effective co-catalyst to enhance the activity of the catalyst by boosting the overall acidity of the ionic liquid-based catalyst. The use of such co-catalysts and ionic liquid catalysts that are useful in practicing the present process are disclosed in U.S. Published Patent Application Nos. 2003/0060359 and 2004/0077914, the disclosures of which are herein incorporated by reference in their entirety. Other co-catalysts that may be used to enhance the catalytic activity of the ionic liquid catalyst include IVB metal compounds preferably IVB metal halides such as $TiCl_3$, $TiCl_4$, $TiBr_3$, $TiBr_4$, $ZrCl_4$, $ZrBr_4$, $HfC_4$, and $HfBr_4$ as described by Hirschauer et al. in U.S. Pat. No. 6,028,024, which document is incorporated by reference in its entirety herein.

Regeneration Conditions

Regeneration, according to the present system or in the present apparatus, can be carried out at a temperature of 20 to 150° C. Alternatively, regeneration can be carried out at a temperature of 60 to 120° C. In general, the temperature will depend upon the type of ionic liquid catalyst and the type of conjunct polymers present. At higher temperatures, the reaction is faster. However, at high temperatures the ionic liquid catalyst may begin to decompose. If hydrogen is not used, the pressure can be autogenic. With hydrogen, any pressure necessary to give the advantage of hydrogen can be employed. Any ratio of ionic liquid catalyst to solvent can be employed, for example, 0.5 to 2 (vol/vol). At higher ratios, extraction is easier, but more costly. The residence time depends upon temperature and the extent of regeneration, but for an alkylation process, the residence time can be 5 minutes to 1.5 hours.

It is not necessary to regenerate the entire charge of catalyst from a process (e.g. alkylation) in the system and apparatus as described herein. In some instances, only a portion or slipstream of the catalyst charge is regenerated. In those instances, the portion regenerated can be the amount necessary to maintain a desired level of catalyst activity in the process that ionic liquid catalyzes.

Although the present system and apparatus have been described in connection with specific embodiments thereof, it will be appreciated by those skilled in the art that additions, deletions, modifications, and substitutions not specifically described may be made without departing from the spirit and scope of the system and apparatus as defined in the appended claims.

That which is claimed is:

1. An apparatus for regenerating an ionic liquid catalyst which has been deactivated by conjunct polymers comprising a reactive extraction column, the reactive extraction column comprising:
   (a) an upper feed port in the upper end of the reactive extraction column for entry of a slurry of ionic liquid catalyst and aluminum metal into the reactive extraction column;
   (b) a lower feed port in the lower end of the reactive extraction column for entry of a solvent and optionally hydrogen gas into the reactive extraction column;
   (c) a lower extraction packing, an upper extraction packing, and a moveable bed comprised of reactive aluminum metal sandwiched between the lower and upper extraction packings, wherein the extraction packings and moveable bed are between the upper and lower feed ports, the aluminum metal being reactive with the ionic liquid catalyst to free conjunct polymers from the ionic liquid catalyst and provide regenerated ionic liquid catalyst;
   (d) a lower exit port in the lower end of the reactive extraction column for exit of the regenerated ionic liquid catalyst from the reactive extraction column; and
   (e) an upper exit port in the upper end of the reactive extraction column for exit of the solvent and freed conjunct polymers from the reactive extraction column.

2. An apparatus according to claim 1, wherein the solvent is a hydrocarbon solvent.

3. An apparatus according to claim 2, wherein the solvent is selected from the group consisting of pentane, hexane, heptane, octane, decane, n-butane, isobutane, isopentane, and mixtures thereof.

4. An apparatus according to claim 1, wherein the ionic liquid catalyst has been used to catalyze a Friedel-Crafts reaction.

5. An apparatus according to claim 4, wherein the Friedel-Crafts reaction is alkylation.

6. An apparatus according to claim 1, wherein the ionic liquid catalyst is selected from the group consisting of:
   a first chloroaluminate ionic liquid catalyst comprising a hydrocarbyl substituted pyridinium halide of the general formula A and aluminum trichloride or a hydrocarbyl substituted imidazolium halide of the general formula B and aluminum trichloride;
   a second chloroaluminate ionic liquid catalyst comprising an alkyl substituted pyridinium halide of the general formula A and aluminum trichloride or an alkyl substituted imidazolium halide of the general formula B and aluminum trichloride; and mixtures thereof,
   wherein the general formula A and the general formula B are represented by the structures:

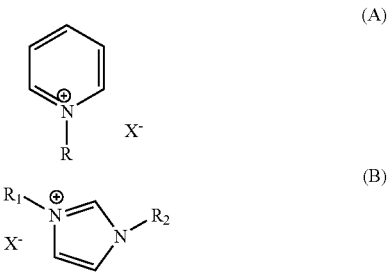

wherein R=H, methyl, ethyl, propyl, butyl, pentyl or hexyl group and X is a haloaluminate, and $R_1$ and $R_2$=H, methyl, ethyl, propyl, butyl, pentyl, or hexyl group and where $R_1$ and $R_2$ may or may not be the same.

7. An apparatus according to claim 6, wherein the first chloroaluminate ionic liquid catalyst is prepared by combining 1 molar equivalent of the hydrocarbyl substituted pyridinium halide or the hydrocarbyl substituted imidazolium halide with 2 molar equivalents of aluminum trichloride.

8. An apparatus according to claim 6, wherein the second chloroaluminate ionic liquid catalyst is prepared by combining 1 molar equivalent of the alkyl substituted pyridinium halide or the alkyl substituted imidazolium halide with 2 molar equivalents of aluminum trichloride.

9. An apparatus according to claim 1, wherein the reactive extraction column further comprises:
   (f) a screen between the moveable bed and the lower extraction packing to trap stray aluminum metal that has left the moveable bed.

10. An apparatus according to claim 1, further comprising:
    a first filter connected to the lower exit port for separating a portion of the aluminum metal from the regenerated ionic liquid catalyst.
    a second filter connected to the upper exit port for separating a portion of the aluminum metal from the solvent and conjunct polymers; and
    a coalescer downstream from the second filter for separating a portion of the regenerated ionic liquid catalyst that is blended with the solvent and the conjunct polymers from the solvent and the conjunct polymers; and
    a recycle inlet port in the upper end of reactive extraction column for entry of the regenerated ionic liquid catalyst that exits the coalescer to the reactive extraction column.

11. An apparatus according to claim 10, wherein the coalescer is a reverse-emulsifier.

12. An apparatus according to claim 1, wherein the reactive extraction column further comprises:
    (f) a settling zone immediately below the upper feed port, wherein the slurry of ionic liquid catalyst and aluminum metal settles after entering the reactive extraction column through the upper feed port;

(g) a first feed distributor below the settling zone for uniformly distributing the slurry of ionic liquid catalyst and aluminum metal from the settling zone into the moveable bed; and (h) a second feed distributor adjacent to the lower feed port in the bottom end of the reactive extraction column for uniformly distributing the solvent from the lower feed port into the moveable bed.

13. An apparatus according to claim 1, wherein at least one of the pair of extraction packings provides an additional reaction zone and increases the aluminum metal reacting to extinction.

14. An apparatus according to claim 13, wherein the pair of extraction packings provides an additional extraction zone for solvent extracting the freed conjunct polymer from an ionic liquid catalyst/conjunct polymer phase.

15. The apparatus according to claim 1, wherein the hydrogen gas is supplied from an outside source.

16. The apparatus according to claim 1, wherein the hydrogen gas is supplied from a separate on-site facility.

17. The apparatus according to claim 16, wherein the separate on-site facility reforms natural gas into hydrogen using steam reforming processes.

18. The apparatus according to claim 1, wherein the ionic liquid catalyst is a pyridinium or imidazolium-based chloroaluminate ionic liquid.

* * * * *